United States Patent [19]

Przybylinski et al.

[11] 4,234,221
[45] Nov. 18, 1980

[54] TROUGH HATCH LOCKING DEVICE

[75] Inventors: Thomas L. Przybylinski; Eugene R. Tylisz, both of Michigan City, Ind.

[73] Assignee: Pullman Incorporated, Chicago, Ill.

[21] Appl. No.: 941,347

[22] Filed: Sep. 11, 1978

[51] Int. Cl.³ .............................................. E05C 3/14
[52] U.S. Cl. .................................. 292/256.5; 292/210
[58] Field of Search .................... 292/256.5, 259, 210, 292/211, 108

[56] References Cited

U.S. PATENT DOCUMENTS

| | | | |
|---|---|---|---|
| 3,041,099 | 6/1962 | Stewart et al. | 292/259 |
| 3,514,142 | 5/1970 | Smith | 292/113 |
| 4,046,082 | 9/1977 | Tedesco et al. | 292/256.5 |
| 4,076,290 | 2/1978 | Sweger | 292/256.5 |

Primary Examiner—Richard E. Moore
Attorney, Agent, or Firm—Richard E. Myers

[57] ABSTRACT

A device for securing a hatch cover has a locking strap pivotally attached at one end and adapted to overlap adjacent end portions of trough hatch covers. The locking strap has a free end engaged by a locking bar which pivots at right angles thereto. The locking bar is part of a unit or module which includes a shackle and a latch hook for holding the locking strap. The shackle is pivotally attached to the locking bar and is weighted with ballast to always be disposed in a vertical position for locking. The latch hook is also weighted and allowed a small amount of rotation to compensate for wear of the sealing gaskets to insure continuous locking engagement between the shackle and the latch.

13 Claims, 9 Drawing Figures

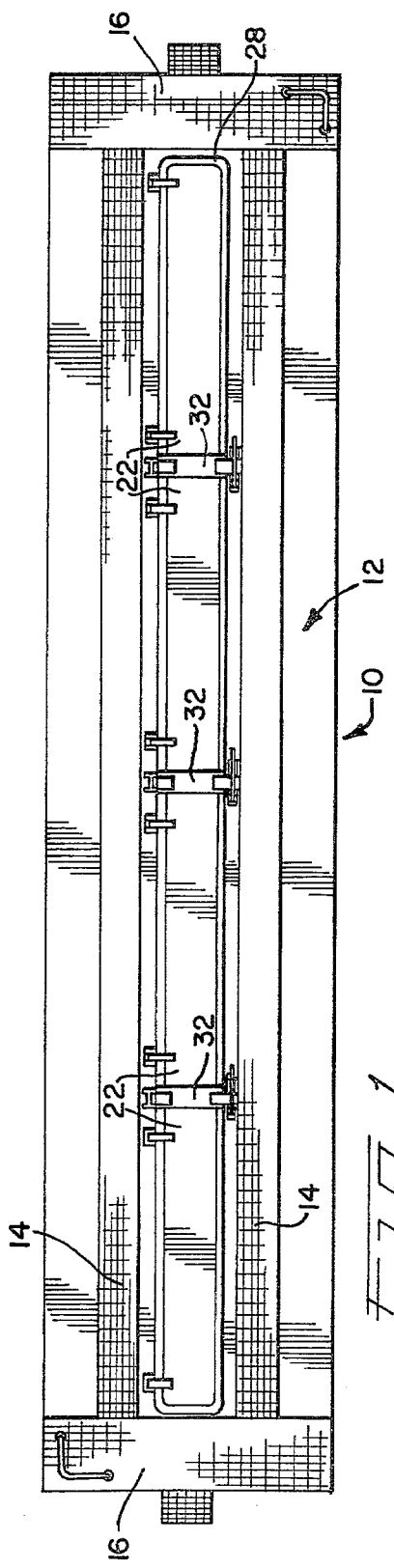
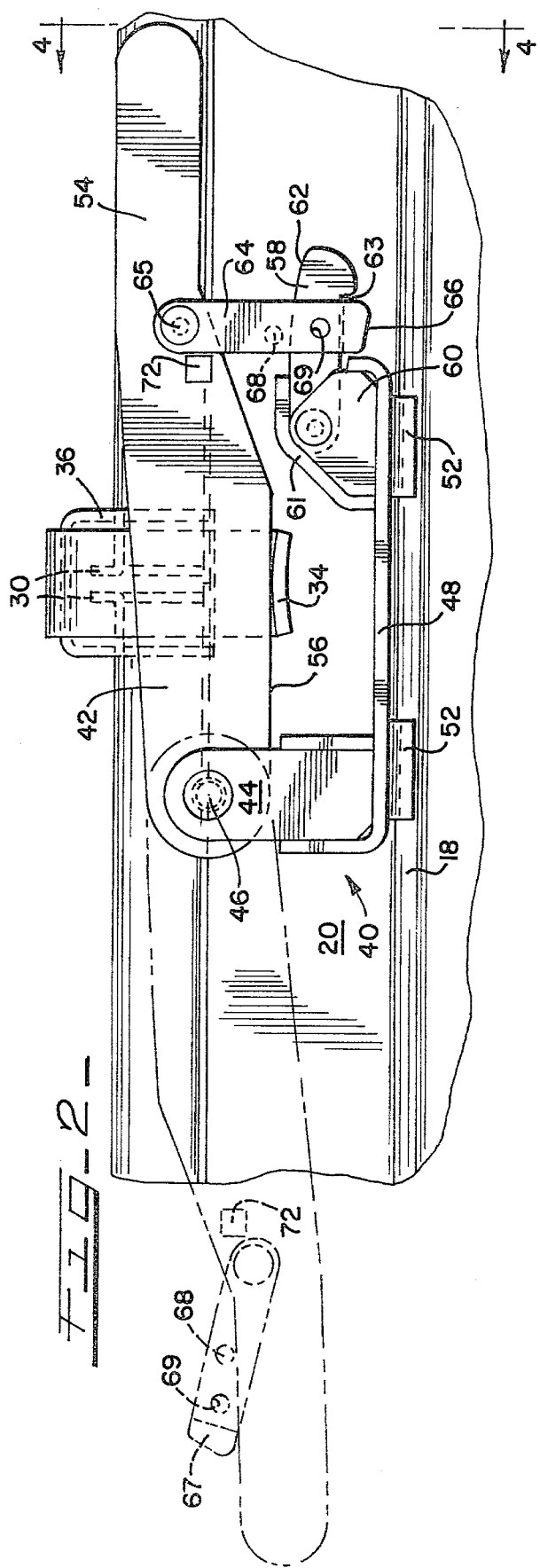

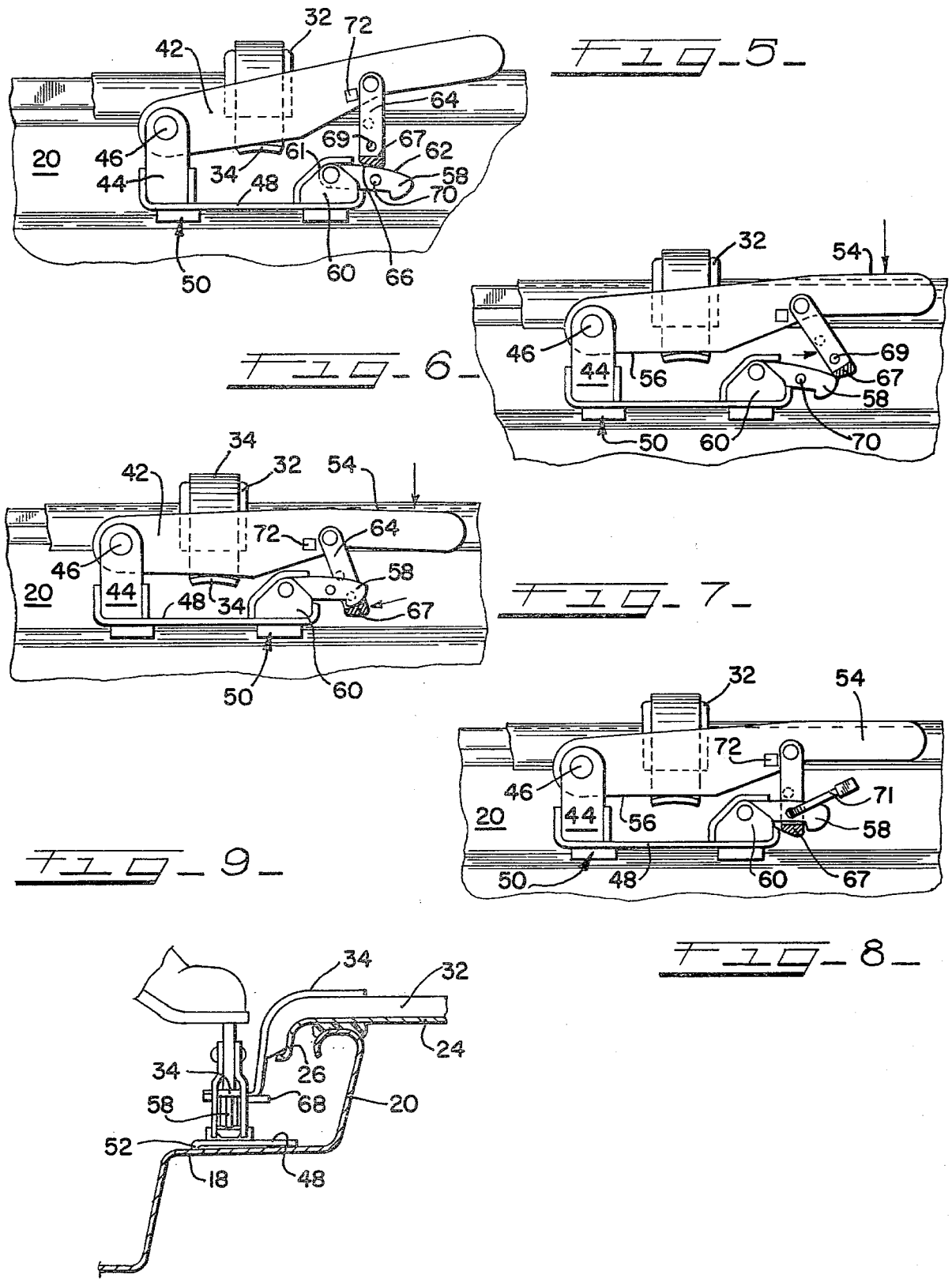

TROUGH HATCH LOCKING DEVICE

BACKGROUND OF THE INVENTION (1) Field of the Invention

This disclosure relates to a locking and securing device for holding down the covers on a trough hatch type of hopper arrangement.

(2) Description of the Prior Art

Prior art patents have disclosed a number of arrangements for closing hoppers and in particular for closing trough hatch hopper covers. These arrangements have included locking bars which engage a portion of the cover engaging strap and include a variety of ways in which the locking bar is secured to the car in a locked position. While satisfactory, the prior art arrangements did not disclose a locking arrangement which would compensate for wear of the hatch cover sealing gaskets in such a fashion as to automatically compensate for the wear to insure that the locking handle would remain in a locked position and remain securely closed as gasket wear occurs.

SUMMARY OF THE INVENTION

This disclosure pertains to hoppers and in particular covered hopper cars used in railroad service and which have elongated trough hatch openings covered by suitably shaped covers. The covers are securely held in a locked down position by transversely extending hinge straps which are engaged at a free end by a locking bar. The locking bar includes a pivotally attached shackle member which swings into locking connection with a pivoted latch hook. Generally, locking engagement is maintained between the shackle and latch hook through a spring force provided by the hatch cover gaskets. The shackle includes a heavy weighted portion which insures that it is always maintained in a generally upright position when the locking bar is in a horizontal position. Similarly, the associated pivoted latch hook is provided with a small degree of rotational movement in order that it may compensate for gasket wear and the loss of locking, spring forces, and move closer to the roof of the car to maintain locking contact with the associated shackle at all times. With this arrangement the shackle and hook remain in contact and cannot be shaken or vibrated apart during transit even after gasket wear has occured.

The shackle and locking hook have cooperating cam surfaces to allow the shackle to pivot and proceed under a portion of the latch hook in order that locking may occur easily and automatically.

The locking bar and associated hook are constructed to be attached to the hopper or the railway vehicle as a unit. Thus, the unit is assembled away from the vehicle and then may be easily welded to the roof sheet as a modular unit. This construction allows for not only ease in the initial manufacturing but also ease of replacement and maintenance in the event such is necessary.

It is an object of the present invention to provide a hopper locking device wherein a locking bar member engages a locking strap which is pivotally mounted at one side of the hopper cover and includes an extension extending over and past the cover to engage the locking bar pivotally mounted at right angles to the strap. The locking bar carries a pivoted shackle which cooperates with the pivoted latch for automatically engaging the two members. The latch and shackle are weighted or arranged in such a fashion to compensate for wear and insure that locking engagement is continuous between the latch and shackle.

These and other objects of the disclosure will become apparent to those having ordinary skill in the art from reference to the following description, drawings and appended claims.

BRIEF DESCRIPTION OF THE DRAWINGS

FIG. 1 is a top plan view of a railway hopper car employing the hatch locking arrangement of this disclosure;

FIG. 2 is an elevational view of the locking device;

FIGS. 5-8 are operational views of the locking device as it moves between an unlocked and a locked postion; and FIG. 9 is a side elevational view showing how the locking device may be engaged by an operator's foot for opening and closing.

DETAILED DESCRIPTION

Figure 4:
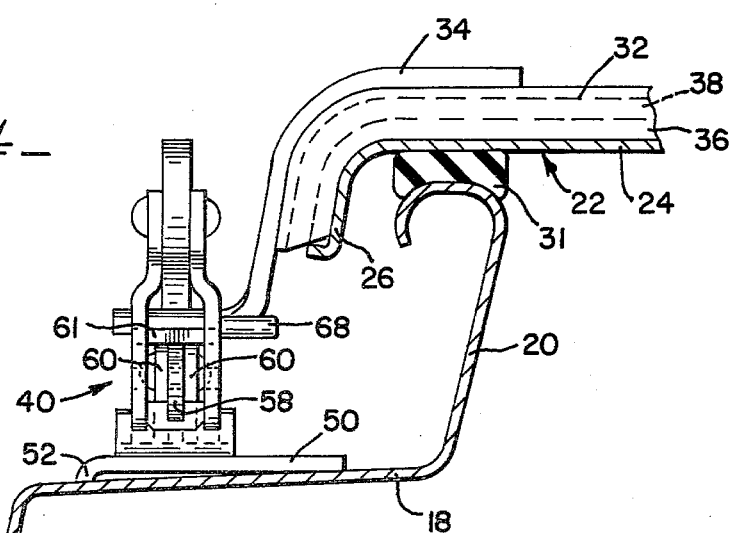
FIG. 4 is a sectional view taken generally along lines 4-4 of FIG. 2.

The drawings illustrate a trough hatch hopper car designated by the numeral 10 which includes a roof structure 12 having a pair of longitudinally extending walkways 14 joining transversely extending end walkways 16. The walkways provide a convenient platform for operators who are opening and closing the hatches. Roof structure 12 generally includes roof sheet 18 which may be a continuous metal sheet extending from side to side of the car. In the configuration illustrated in the drawings the roof sheet 18 is a stepped sheet having a number of surfaces at different heights in order to provide both increased volume capacity to the car and an integrally rigid structure which resists stresses. Sheet 18 is provided with a continuous coaming 20 which is an upstanding portion having a rounded top flange and which provides an opening extending the length of the car for conveniently filling the car with material. Hatch covers 22 are pivotally mounted on the roof structure 12 to move easily from an open position to allow the car to be filled to a closed position to seal off the trough hatch and prevent entrance of moisture or other contaminants into the car interior. As shown in FIGS. 1 and 4, the hatch covers 22 include a generally flat top portion 24 extending between downwardly extending sides 26 which form the longitudinally extending edges of hatch covers 22. Each end hatch cover includes a transverse and downwardly extending end portion 28 which insures that the ends of the trough are adequately covered. Spaced inwardly from the end flange portions 28 are upturned, intermediate ends 30 (FIG. 2) which are located adjacent one another when the covers are in a closed position. A sealing gasket 31 extends along the length of each hatch cover 22 and forms a complete seal between the hatch covers and the coaming 20. Sealing gasket 31 is secured to the under side of the hatch cover 22 and extends around the outer periphery of the hatch cover 22 to form a water and air-tight seal with the upper, round portion of the coaming 20. The gaskets 31 provide a spring, locking force when compressed which maintains locking engagement of the hatch cover locking elements.

A number of hinged locking straps 32 are positioned for pivotal movement in the area adjacent the upturned ends 30 of the trough hatch covers 22. Each hinged locking strap 32 includes a locking extension 34 which extends outwardly of the coaming for locking engagement with a car mounted locking unit. Locking straps 32 provide an inverted U-shaped cross section member 36 which extends across the hatch covers 22. Positioned within the U-shaped portion is a gasket 38 which is adapted to engage the upturned ends 30 of the hatch covers 22 and thereby provide a complete air and moisture tight seal.

A locking unit designated generally 40 is positioned adjacent the locking extension 34 and includes a pivoted locking bar 42 which contacts the locking extension 34 to lock and hold the bar in a closed position. Locking bar 42 is positioned above the roof sheet 18 by a hinged lug 44 and a suitable sized pivot member 46. Locking unit 40 includes a mounting plate 48 which is located to extend longitudinally and generally parallel with the locking bar 42. Mounting pods 50 have downward extending flanges 52 which are adapted for direct attachment of the locking unit 40 to the roof sheet 18. Thus, as shown in FIG. 4, the flanges 52 are of such a length as to locate and provide a level mounting for the locking unit 40 even though the roof sheets 18 may be irregular or sloped in shape. Further, the mounting plate 48 and associated pods provide a modular or unitary locking unit which may be easily attached to the hopper and which also provides an improved design for ease of maintenance and replacement.

As shown in FIG. 2, the locking bar 42 has a handle portion 54 which may be manually engaged or which may be contacted by depressing with an operator's foot as shown in FIG. 9. Locking bar 42 also includes a so-called contacting section 56 which engages the locking extension 34 of locking strap 32.

Locking unit 40 also includes a pivoted latch hook 58 which is mounted to the mounting plate 48 with lugs 60. Stop plate 61 extends upwardly from the mounting plate 48 to engage, and limit movement of, the top part of the latch hook 58. Latch hook 58 includes a sloped surface 62 and a notch or cut out 63 which is used for locking purposes.

A shackle 64 is pivotally attached at 65 to the locking bar 42. Shackle 64 includes a sloped bottom 66 which cooperates with the sloped surface 62 of the latch hook 58 to allow the shackle to slide over the nose portion of the latch hook 58. Latch hook 58 is normally in the position shown in FIG. 5 and remains in such position until shackle 64 is positioned adjacent the underside of the notch 63 for locking the two members together. The lower portion of the shackle 64 includes a filler ballast 67 which is an addition of a weighted material or may be a heavy section by design to insure that the shackle always is extending downwardly when the locking bar is in an about-to-be locked position.

Figure 3:
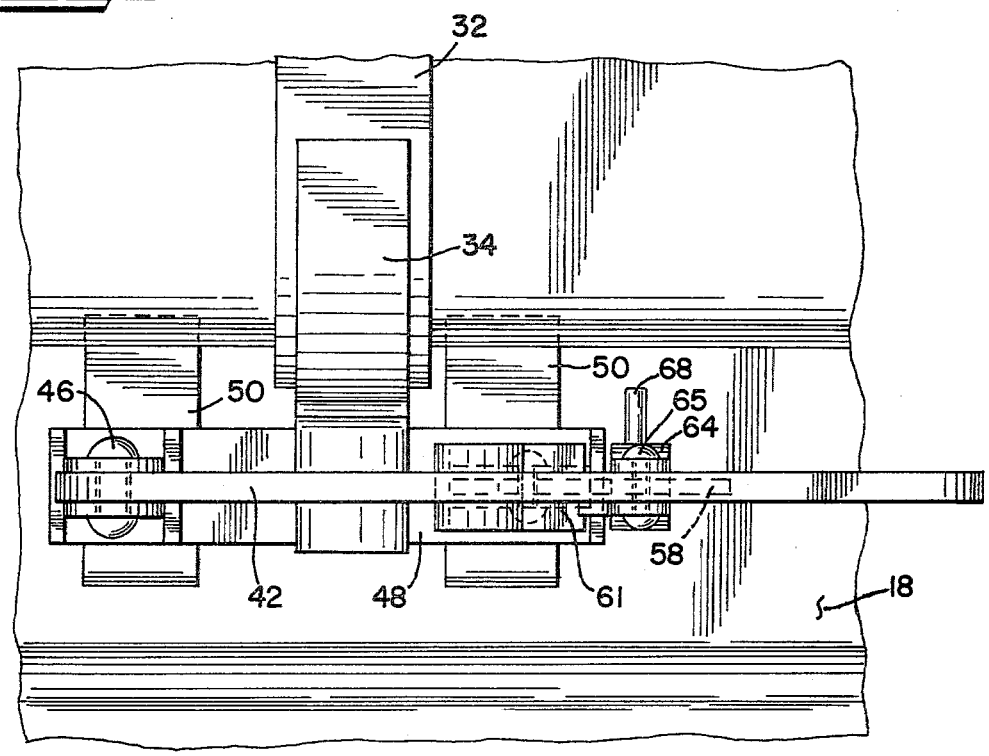
FIG. 3 is a top plan view of the locking device illustrated in FIG. 2.

As shown in FIGS. 3 and 4, the shackle may include a finger grip 68 which is used to disengage the shackle from the latch hook 58. The latch 58 and shackle 64 may include a pair of openings 69, 70, which are aligned when the two members are locked and which may receive a car seal 71 (FIG. 8).

A stop 72 is located on the locking bar 42 in such a fashion to limit rotation of the shackle 64 to insure that the shackle always points downwardly and is in position to automatically lock with the latch hook 58 when locking bar 42 is horizontal.

The operation of the locking unit 40 is shown with reference to FIGS. 5–9. FIG. 5 illustrates the arrangement of the members as contact is initiated between the sloped surface 62 of the latch 58 and the sloped bottom 66 of the shackle 64. When surfaces 62 and 66 contact as the handle 42 is urged clockwise, downwardly, a camming action occurs whereby the shackle 64 rotates counter-clockwise until it clears the end of the latch hook 58. As shown in FIG. 6, the latch 58 proceeds from the end of the latch 58 and comes into alignment with the underside of the latch 58 as the handle 42 proceeds downwardly (FIG. 7). In a fully closed position the gaskets 31, 38 are compressed and the shackle 64 is in the position shown in FIGS. 2 and 7 with the latch hook 58 in its uppermost position. At such time the lower portion 67 of the shackle 64 is fitted into the underside or notch 63 of the latch 58 to insure that the handle remains in a locked, down position at all times. Stop plate 61 limits upward rotation of the latch hook 58.

It is known that during use, gaskets become worn, thus while they generally have excellent dimensional stability, some compression or dimensional changes called set can occur. Resulting dimensional changes will cause the locking bar 42 to assume a position closer to the roof sheet 18. As locking bar 42 moves closer to the roof sheet as gasket wear occurs the dimensional change is compensated for by this design since latch hook 58 is allowed to rotate downwardly and move closer to the roof sheet 18. Thus, it can be seen that although some wear may occur, latch member 58 will remain in contact with the shackle and prevent unlocking which would otherwise occur if the latch hook 58 were permanently fixed.

Thus it has been shown that the disclosure of this invention provides a unitary or modular hopper cover locking arrangement which may be easily aligned and attached to a hopper. While the design shown herein has been made with reference to a trough hatch hopper car, it is also contemplated that this locking arrangement could be used on stationary hoppers or circular hatch hoppers. It has also been shown that the device disclosed herein provides a new and unobvious arrangement for compensating for the ever present gasket wear which can and does occur from many openings and closings of the hopper hatches. Although normally the gaskets provide a spring type of arrangement which forces the locking bar 42 upwardly, if excessive wear occurs this self-locking spring feature provided by the gasket would disappear. The self-locking feature of this disclosure which insures continuous locking engagement between latch hook 58 and shackle 64 becomes critical to be sure that the trough hatch does not open during transit.

The foregoing description and drawings merely explain and illustrate the invention and the invention is not limited thereto, except insofar as the appended claims are so limited, as those who are skilled in the art and have the disclosure before them will be able to make modifications and variations therein without departing from the scope of the invention.

What is claimed is:

1. A locking device for a hopper having a roof provided with a hatch opening surrounded by upstanding coaming, and pivoted hatch cover means rotatable to engage said coaming to close the hatch opening, the improvement comprising;

a pivoted hinge strap with means adjacent said hatch opening for supporting the hinge strap;

said hinge strap including means rotatable in a first plane between a hatch open position away from said hatch cover and a hatch closed position adjacent said hatch cover;

said hinge strap having a locking extension protruding outwardly of said coaming when the hinge is in the hatch closed position;

a locking bar having bracket means mounted on the roof for rotational movement of the bar in a second plane transverse to said first plane, and said locking bar being movable between a locked and unlocked position;

means on the locking bar engaging the hinge strap extension when the locking bar is in said locked position and the hinge strap is in the hatch closed position;

means for securely interconnecting the hinge strap and locking bar;

said means for interconnecting comprising a shackle and a latch hook;

shackle pivot means mounting said shackle intermediate the ends of the locking bar for pivotal movement;

latch pivot means on said bracket means pivotally mounting said latch hook for limited, rotational movement;

stop means with means associated with said latch hook for limiting the rotation of said latch hook between a first position away from the hopper and a second position closer to said hopper;

said latch hook and said shackle including cooperating surface means for automatically pivoting the shackle about the locking end portion of the latch and automatically positioning the shackle and latch in a locked position.

2. The locking device of claim 1 wherein said shackle includes:

ballast means for weighing the end of the shackle for automatically maintaining the shackle in a vertical position when the locking bar is in a generally horizontal position.

3. The locking device of claim 1, and:

said locking bar having handle means, and further stop means on the locking bar engageable with the shackle for limiting rotation of the shackle between the further stop means and a portion of the handle means.

4. The locking device of claim 1, and:

said bracket means for adapting the locking bar and latch hook fixedly to the hopper;

said bracket means including a plate having flange portions for holding and supporting;

mounting pods on said bracket means with means for attaching and leveling said bracket means.

5. The locking device of claim 1; and, gasket means with means urging said hatch cover upwardly with a spring force into contact with said hinge straps when said locking bar is urged downwardly on said locking extension;

said gasket providing an upward force urging the latch hook into engagement with said stop means for securely holding said shackle;

said latch pivot means permitting the latch hook to maintain locking engagement with the shackle in the absence of said spring force.

6. For a railway hopper car having a roof structure provided with a hatch opening surrounded by an upstanding coaming, and pivoted hatch cover means rotatable to close the hatch opening and a pivoted hinge strap having a locking extension protruding outwardly of said opening when the hinge strap is in the hatch closed position:

a modular locking unit comprising, bracket means having a locking bar mounted for rotational movement between a locked and unlocked position, said bracket means having mounting means for attaching the unit adapted to be mounted on an associated roof structure adjacent to the hatch opening so that the plane of movement of the locking bar is adapted to be transverse to the plane of movement of the hinge strap, means on the locking bar adapted to engage the hinge strap in the hatch closed position when the locking bar is in a locked position, means for securely maintaining engagement between the hinge strap and locking bar comprising a shackle pivotally mounted intermediate the ends of said locking bar and a latch hook pivotally mounted with said bracket means for limited rotational movement, stop means associated with said latch hook for limiting the rotation of said latch hook between a first position away from the hopper and a second position closer to said hopper, and said latch hook and said shackle including cooperating surface means for automatically positioning the shackle and latch in a locked position.

7. The modular locking unit of claim 6, and said shackle including ballast means for weighing the end of the shackle for automatically maintaining the shackle in a vertical position when the locking bar is in a generally horizontal position.

8. The modular locking unit of claim 6, and further stop means on the locking bar engagable by the shackle to position the shackle generally vertically to cooperate and lock with the latch hook, when the locking bar is in a generally horizontal position.

9. A railway hopper car comprising:

a locking device for said hopper car having a roof provided with a hatch opening surrounded by upstanding coaming, and pivoted hatch covers rotatable to engage said coaming to close the hatch opening, a pivoted hinge strap with means adjacent said hatch opening for supporting the hinge strap, said hinge strap including means rotatable in a first plane between a hatch open position away from said hatch cover in a hatch closed position adjacent said hatch cover, said hinge strap having a locking extension protruding outwardly of said coaming when the hinge is in the hatch closed position, a locking bar having bracket means mounted on the roof for rotational movement of the bar in a second plane transverse to said first plane and said locking bar being movable between a locked and unlocked position, means on the locking bar engaging the hinge strap extension when the locking bar is in said locked position and the hinge strap is in the hatch closed position, means for securely engaging the hinge strap and locking bar comprising a shackle pivotally mounted intermediate the ends of said locking bar and a latch hook pivotally mounted with said bracket means for limited rotational movement, and said latch hook and said shackle including cooperating surface means for automatically pivoting the shackle about the latch and automatically positioning the shackle and the latch in a locked position.

10. The locking device of claim 9, and said shackle including ballast means for weighing the ends of the shackle for automatically maintaining the shackle in a vertical position when the locking bar is in a generally horizonal position.

11. The locking device of claim 9, and having stop means engageable with the shackle for limiting rotation of the shackle to insure a vertical position to cooperate and lock with the latch hook, when the locked bar is in a generally horizontal position.

12. The locking device of claim 9, and said bracket means for adapting the locking bar and latch hook fixedly to the hopper, said bracket means including a plate having flange portions for holding and supporting, and mounting pods with means for attaching and leveling said locking handle and latch hook.

13. The locking device of claim 9, and having gasket means generally disposed between said coaming and said hatch cover urging said hatch cover upwardly with a spring force into contact with said straps with said locking bars urging downwardly on said locking extension, further stop means associated with said bracket means for allowing limited upward movement of said latch hook, said gasket providing an upward force urging the latch hook into engagement with said further stopping means for securely holding said shackle, and said latch hook pivoting to maintain locking engagement with the shackle in the absence of said spring force.

* * * * *